Sept. 12, 1950 W. POLITZER 2,521,994
AMPLIFYING ARRANGEMENT FOR SELF-SYNCHRONIZING
TRANSMISSION SYSTEMS
Filed May 25, 1949 3 Sheets-Sheet 1

INVENTOR
WILLIAM POLITZER

Patented Sept. 12, 1950

2,521,994

UNITED STATES PATENT OFFICE 2,521,994

AMPLIFYING ARRANGEMENT FOR SELF-SYNCHRONIZING TRANSMISSION SYSTEMS

William Politzer, Le Perreux, France

Application May 25, 1949, Serial No. 95,338
In France December 14, 1948

8 Claims. (Cl. 318—23.5)

Self-synchronising transmission systems have recently acquired great importance and their field of application is constantly expanding.

Such arrangements, which comprise electrical machines, must bring the directing element, or transmitter, into a position which agrees with that of the driven element, or receiver, at stoppage and must ensure that the rotational movements of the said elements are in synchronism. The arrangement functions as if the transmitter and the receiver were connected by a mechanical shaft.

Figure 1:
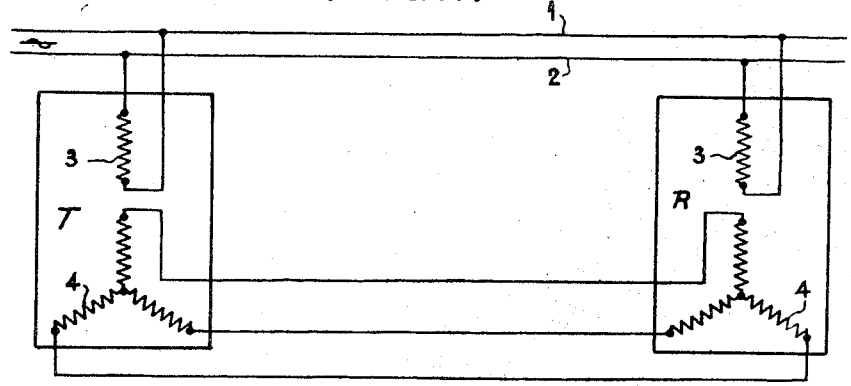
Figure 1 is a diagram representing a known self-synchronising transmission arrangement.

Figure 1 shows the electrical diagram of a self-synchronising transmission arrangement in its simplest form. The transmitter and the receiver are small motors, the field windings 3 of which are fed with single-phase alternating current from the supply 1, 2. The three-phase armatures 4 are connected together phase by phase.

Such arrangements are referred to in English literature under different names, such as "Selsyn," "Autosyn," "Position Indicator," "Synchrotie," etc. They have been very widely employed as position indicators or for the transmission of small torques. It is known, in fact, that the torque developed by the receiver must be supplied entirely by the transmitter.

Figure 2:
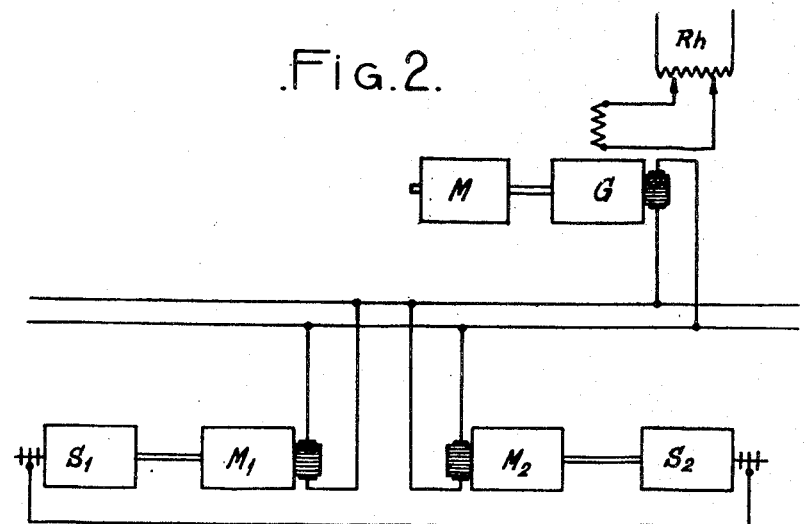
Figure 2 is another diagram illustrating the use of a Ward-Leonard system, with a synchronising motor.
Figure 3:
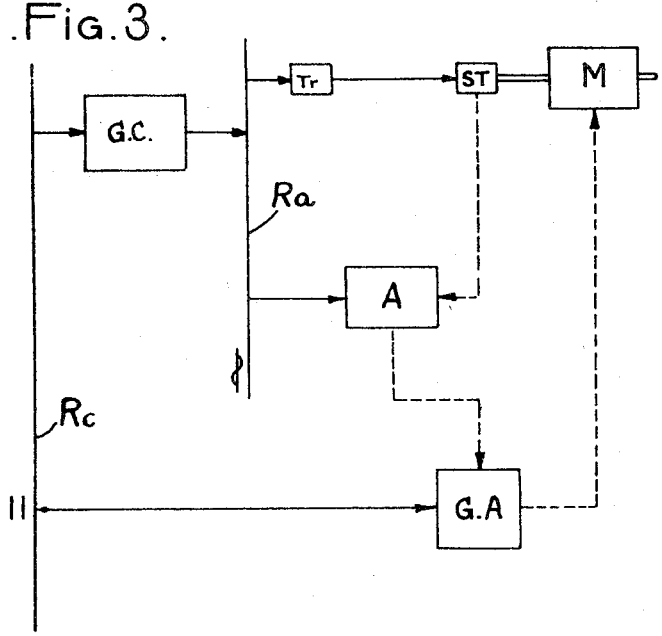
Figure 3 shows diagrammatically a synchronising arrangement functioning with the aid of secondary elements generally of an electronic type.

When it is desired to transmit larger torques, use is generally made of the well known Ward-Leonard system, which provides one of the essential conditions for the transmissions: the possibility of speed regulation within wide limits and rotation in both directions. The Ward-Leonard system, however, does not ensure synchronism of the movements between the transmitter and the various receivers. A very widely adopted solution consists in providing the Ward-Leonard system with a synchronising arrangement of the self-synchronising type. Figure 2 shows the diagram of such an arrangement. The control element is the exciting rheostat $Rh$ of the Ward-Leonard generator. The driving motor M of the unit may be a direct-current or alternating-current motor, depending upon the available supply. The variable voltage generator G feeds the control motors M1 M2, the constant voltage excitation of which is not shown. This control supply must be a direct-current supply. Each motor is coupled with a synchronising motor S1 S2, the function of which is to ensure agreement between the different receivers. Their supply must be a single-phase or three-phase alternating current supply. It will readily be understood that such an arrangement becomes heavy and cumbersome. The power is installed in two stages, and there are two supplies, one being a direct-current supply and the other an alternating-current supply. There exist at present a very large number of arrangements based on the principle of the Ward-Leonard system. The excitation feed of the Ward-Leonard generator can be effected by electronic means. The generator itself may be replaced by thyratrons. When the powers applied are very high it is possible to use, for exciting the Ward-Leonard generator, an electromagnetic amplifier of the amplidyne type which is itself controlled by an electronic device. In order to avoid two supplies, one for the direct-current control and the other for the alternating-current synchronisation, the latter is frequently replaced by a control supply composed of small self-synchronising motors, which cause the transmitter to follow-up the control motor, and modify its position until an homologous position is obtained. There exist a large number of arrangements of this type, in which self-synchronising motors, synchronising transformers, electric or magnetic amplifiers, tachometric dynamos and the like are employed as the secondary element. The general lay-put of such an arrangement is diagrammatically illustrated by way of example in Figure 3, the elements of each circuit having been omitted.

The synchronising transformer ST connected to the driving motor M indicates a difference in position between the driving motor and the transmitter Tr in the form of a voltage. This voltage is transmitted to the amplifier A and produces the excitation of the generator of the amplifying group G. A. The voltage of the generator of this group rotates the control motor M until the difference in voltage of the synchronising transformer disappears. Rc and Ra are the direct-current and alternating-current supplies, the latter being fed through a converter unit G. C.

Figure 4:
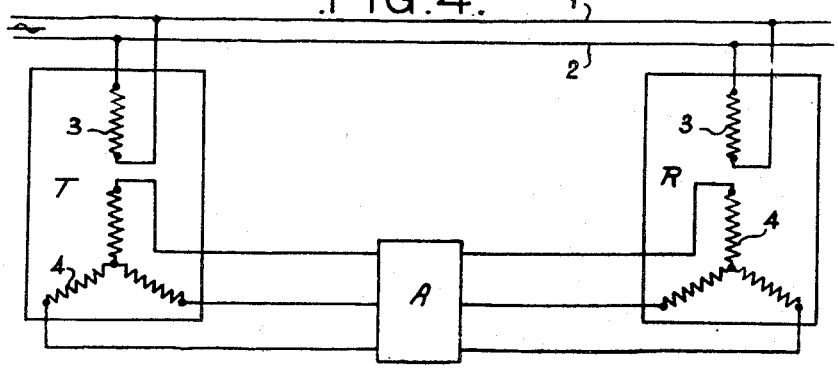
Figure 4 shows diagrammatically the principle of the arrangement forming the subject of the invention.

The object of the present invention is to provide an amplification between the transmitter and the receiver or receivers in the simplest form of self-synchronising transmission system such as that shown in Figure 1. While the simplicity and the robustness of the original self-synchronising system are preserved, the said system is provided with what it principally lacks, namely amplification. The general scheme becomes that shown in Figure 4, in which A designates the amplifier introduced between the transmitter and the receiver.

Analysis of the operation of the self-synchronising transmission system shows that the homologous position of the receiver R with respect to the transmitter T is ensured at each instant by the well-defined direction of the armature field in space.

This field is transmitted from the transmitter to the receiver by the currents of the three phases of the armature.

In fact, these currents, which are variable in magnitude in time, act as components and give at each instant a resultant whose direction varies in space.

The present invention is concerned essentially with a method which consists in separately amplifying each of the phases of the armature of the transmitter, acting as components of the armature field of the receiver.

Figure 5:
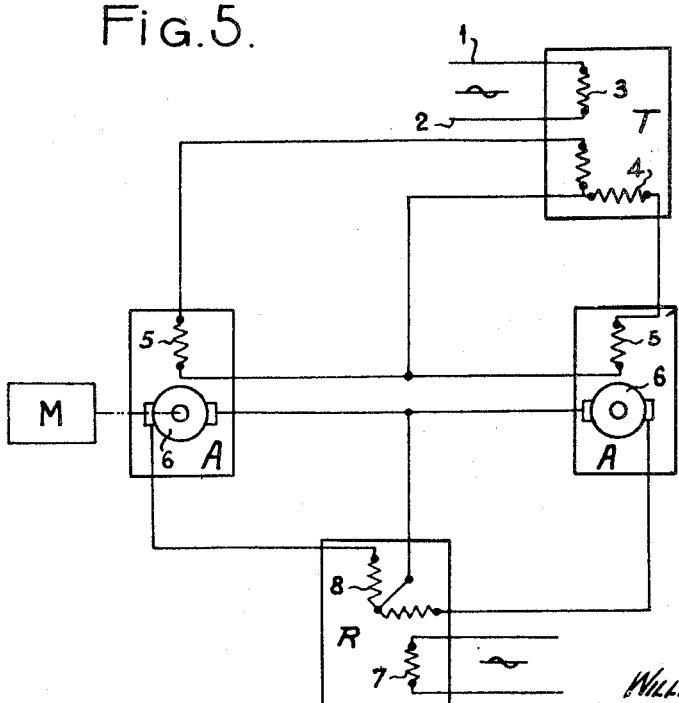
Figure 5 shows in greater detail, but also diagrammatically, the constituent elements and the general connections of the arrangement according to the invention.

Figure 5 clearly shows the principle of this amplification, and represents a transmitter T whose field winding 3 is fed with the single-phase alternating current from the supply 1, 2, and whose armature 4 is a two-phase armature. In accordance with the invention, the amplifying group A, which is driven by a motor M of substantially constant speed, comprises as many amplifiers as there are phases of the armature of the transmitter, namely two in the example shown. Each phase feeds the field winding 5 of an amplifier 6. The armatures of these amplifiers re-constitute the coupling of the phases of the transmitter and feed the receiver R, which is diagrammatically represented by its field winding 7 and its armature 8.

The amplifiers 6 are of the type comprising a commutator and are similar in construction to repulsion motors. However, in accordance with a further feature of the invention, the brushes of the said amplifiers are keyed on an axis which is strictly perpendicular to the axis of the fields. Under these conditions, the voltage collected at the brushes is purely induced by rotation and does not comprise any component due to transformation, so that the production of any rotating field (on which the operation of the repulsion motor is based) is avoided. Moreover, there is provided on the stator of the amplifiers, in accordance with the invention, a compensating winding (not shown) whose object is to suppress any perpendicular field and to reduce the inductance drops.

These machines have excellent communtation, since their speed is constant and since the fixed keying of the brushes enables them to be provided with compensating and commutating windings.

The momentary value of each phase of the transmitter T is faithfully transmitted after amplification to the receivers R which receive in each phase a power which is proportionately increased in accordance with the amplification ratio of the group A.

The operation of the receivers is excellent and their torque is greatest when there is no phase-shifting between the currents of the field winding and of the armature. Now, phase-shifting may occur as the currents pass through the different circuits of the amplifier. This disadvantage can readily be overcome should it arise, by providing for the feeding of the receivers or the transformer, a phase shifter which restores the two currents to phase agreement.

When the supply is an alternating-current supply, no conversion to direct current is necessary, a single alternating current distribution being required. Any existing transmitter or receiver can be employed in an amplifying arrangement constructed in accordance with the invention, because the field and armature circuits of the amplifiers can be arranged for the voltages corresponding to the existing elements. This fact is important in the case of arrangements already comprising a standard series of self-synchronising motors which can be employed without any modification.

It is furthermore possible in accordance with the invention in an existing self-synchronising transmission system, either to increase the number of receivers or to increase the power thereof without altering the transmitter and its supply, by merely connecting the amplifying group according to the present invention between the said supply and the supply of the receivers.

In other systems, in which the synchronism of the receivers with the transmitter is produced by means of intermediate members, a delay detrimentally affecting good operation may arise between the transmitter and the controlled motor. In other cases, on the contrary, when the control is electronic the rapidity of response of the electronic device may give rise in the mechanical parts to dangerous oscillations which must be damped out by special means. In the arrangement according to the invention, the transmission takes place through an amplifying group constituted by alternating-current machines. The magnetic inertia of the said machines is very low and they therefore do not set up any appreciable delay. Consequently, the rapidity of response will be compatible with the mechanical inertia of the parts set in motion and usually no accelerator and no damping means will be required. However, there is nothing to prevent this basis system being provided either with accelerators or with damping means in exceptional cases.

It is known that the amplification factor is generally defined as the ratio between the torques developed by the receivers and the torque necessary for controlling the transmitter. This ratio can be very high in arrangements designed in accordance with the present invention because the transmitter generally supplies only the exciting currents for the amplifiers. The said transmitter receives the electric power necessary, and its driving torque is limited to the frictional torque of the apparatus.

A self-synchronizing transmission installation with amplification, designed in accordance with the invention, will now be described by way of non-limitative example, together with the necessary calculations, this example being intended solely to show the order of magnitude of the amplifications which can be obtained.

The installation has a total power of 10 kva. The amplifying unit is therefore designed for this power. An exciting power of the order of 10% can be assumed with machines of good construction having a high speed of rotation. The power passing through the transmitter is therefore about 1 kva. However, this transmitter has no electro-magnetic couple, and the torque necessary for driving the transmitter is thus limited to the frictional torque. This frictional torque can be calculated at 5% of the nominal power, namely 50 watts. The coefficient of amplification of the whole arrangement is therefore $10 \times 20 = 200$.

This reasoning is only valid in the case of a transmitter rotating at constant speed. In fact, in the case of speed variations the driving torque of the transmitter becomes greater, the accelerating torque being added to the frictional torque. It will be noted that the accelerations which can be imparted to the transmitter are limited by its inertia, which can to a certain extent be regarded as an advantage. In fact, the receivers are thus protected from sudden movements which might cause the synchronous system to fall out of step.

Figure 6:
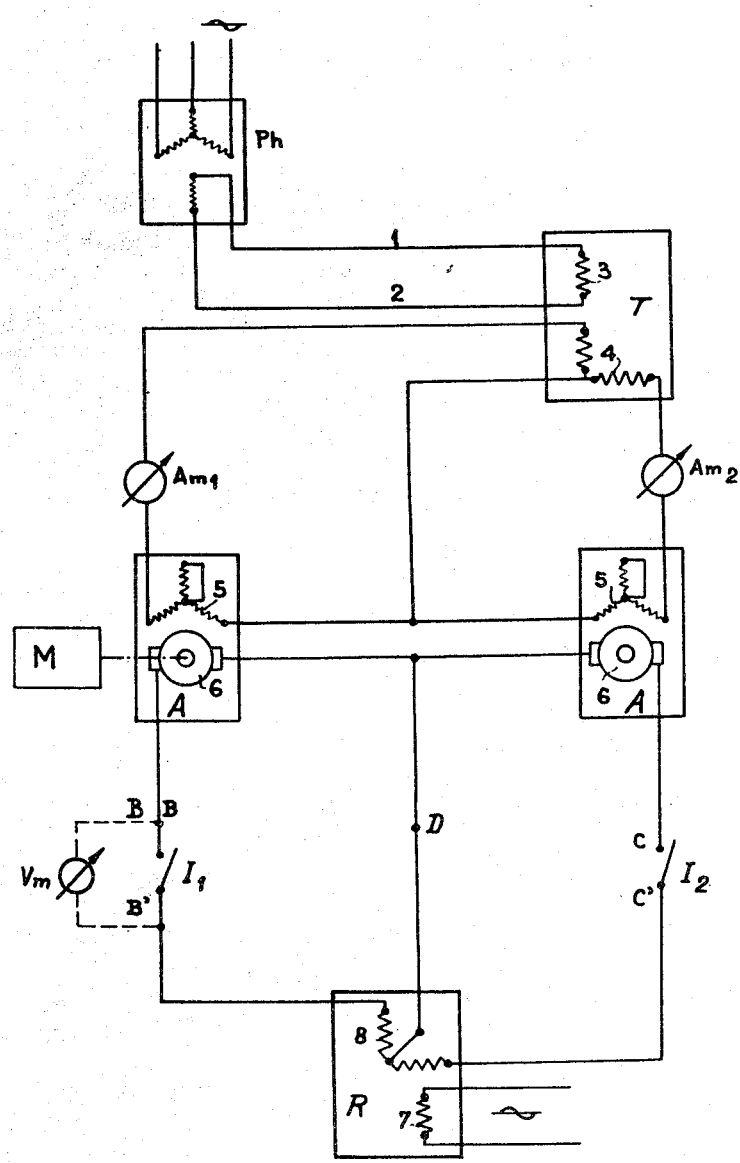
Figure 6 is a more detailed diagram, showing in addition a controlling equipment.

The scheme of connections shown in Figure 6 comprises, in addition to the component elements of the installation shown in Figure 5, a testing arrangement comprising a voltmeter $Vm$, ammeters $Am1$, $Am2$ and switches $I1$ and $I2$. There is also shown in this diagram a phase shifter $Ph$ connected in the feed circuit of the transmitter.

It is possible with such means to carry out the preliminary testing of the windings and to check the accuracy of the connections before the installation is put into use.

It is first necessary to ensure, by a preliminary test, the accuracy of the keying of the brushes of the amplifiers A. This test can be carried out on each amplifier in the stationary condition, the field winding and the armature being considered as the primary winding and the secondary winding respectively of a static transformer. For example the field winding is fed by a suitable alternating voltage, and a voltmeter is connected to the brushes. The keying is accurate when no voltage arises. The roles of the field winding and of the armature may be reversed by feeding the brushes and connecting the voltmeter to the field winding.

Since the amplifying group A is always stationary, the exciting circuits can then be tested. These circuits comprise for each phase a winding of the armature of the transmitter in series with the exciting winding of an amplifier. The latter is constituted, in the example of Figure 6, by three-phase windings 5, two phases of which form the exciting winding, while the third phase, which is short-circuited on itself, represents the compensating winding perpendicular to the axis of the brushes.

The field winding of the transmitter is fed at normal voltage and, by slowly rotating the rotor of the transmitter it is found that the intensities of excitation indicated by the ammeters $Am1$ and $Am2$ have the same maximum values in the two phases, but that these maximum values appear with a phase displacement of $\pi/2$ that is to say, when the intensity is maximum in one phase it is zero in the other phase.

The amplifying group is then started, the transmitter and the receiver being fed normally, but the switches $I1$ and $I2$ being open.

Since the exciting current is successively adjusted in each phase to its maximum value, it will be seen that the voltages measured between the points B D and C D are identical. The maximum values of these voltages are obtained by slowly rotating the rotor of the receiver R. The voltages between B D and B' D and between C D and C' D must be substantially equal.

It finally remains to determine whether there is an appreciable phase displacement between the voltages supplied by the amplifiers A and the voltages set up in opposition thereto by the armature of the receiver R. For this purpose, the voltage B D is adjusted to its maximum value by slowly rotating the rotor of the transmitter T. The voltage B' D is also adjusted to its maximum value by slowly rotating the rotor of the receiver R. The value of the voltage between B and B' is a measure of the phase displacement. If the phases are equal, this voltage is zero. Up to a certain degree, this phase displacement does not prevent good operation of the installation but if it is of high value it is expedient to cancel it out by feeding either the transmitter or the receiver through a phase shifter. In the circuit arrangement shown in Figure 6, a phase shifter $Ph$ is connected to the feed of the transmitter. Adjustment to phase equality is effected with the aid of the voltmeter connected between B and B'. The rotor of the phase shifter is rotated until the voltages between B and B' cancel each other out. The switches $I_1$ and $I_2$ can then be closed, and the group is ready for operation.

The practical details described with references to Figure 6 overcome any material difficulty in carrying the invention described into effect and ensure the effective achievement of the desired result.

I claim:

1. In a self-synchronising transmitting arrangement, a transmitting element of the self-synchronising induction type, an amplifying element constituted by a group of rotary machines, connected in the circuit of each phase of the armature of the transmitter, a motor of substantially constant speed driving the said amplifier and receivers of the self-synchronising type.

2. In a self-synchronising transmitting arrangement a transmitting element of the self-synchronising induction type an amplifying element constituted by a group of rotary machines connected in the circuit of each phase of the armature of the transmitter, a motor of substantially constant speed driving the said amplifier and receivers of the self-synchronising type, the number of rotary machines of the amplifier being equal to the number of phases of the armature of the transmitter.

3. In a self-synchronising transmitting arrangement, a transmitting element of the self-synchronising induction type, an amplifying element constituted by a group of rotary machines comprising a commutator whose brushes are keyed on an axis strictly perpendicular to the axis of the magnetic field, the said amplifying element being connected in the circuit of each phase of the armature of the transmitter, a motor of substantially constant speed driving the said amplifier and receivers of the self-synchronising type.

4. In a self-synchronising transmitting arrangement, a transmitting element of the self-synchronising induction type, an amplifying element constituted by a group of rotary machines comprising a commutator whose brushes are keyed on an axis strictly perpendicular to the axis of the magnetic field, and whose stator is provided with a compensating winding, the said amplifying element being connected in the circuit of each phase of the armature of the transmitter, a motor of substantially constant speed driving the said amplifier, and receivers of the self-synchronising type.

5. In a self-synchronising transmitting arrangement, a transmitting element of the self-synchronising induction type, an amplifying element constituted by a group of rotary machines comprising a commutator whose brushes are keyed on an axis strictly parallel to the axis of the magnetic field, and whose stator is provided with commutating windings, the said amplifying element being connected in the circuit of each phase of the armature of the transmitter, a motor of substantially constant speed driving the said amplifier, and receivers of the self-synchronising type.

6. In a self-synchronising transmitting arrangement, a transmitting element of the self-synchronising induction type, an amplifying element constituted by a group of rotary machines comprising a commutator whose brushes are keyed on an axis strictly perpendicular to the axis of the magnetic field, and whose stator is provided with compensating windings, and with commutating windings, the said amplifying element being connected in the circuit of each phase of the armature of the transmitter, a motor of substantially constant speed driving the said amplifier, and receivers of the self-synchronising type.

7. In a self-synchronising transmitting arrangement, a transmitting element of the self-synchronising induction type, an amplifying element constituted by a group of rotary machines connected in the circuit of each phase of the armature of the transmitter, a motor of substantially constant speed driving the said amplifier, and receivers of the self-synchronising type, the number of rotary machines of the amplifier being equal to the number of phases of the armature of the transmitter, and a phase shifter connected in the feed circuit of the transmitter.

8. In a self-synchronising transmitting arrangement, a transmitting element of the self-synchronising induction type, an amplifying element constituted by a group of rotary machines connected in the circuit of each phase of the armature of the transmittter, a motor of substantially constant speed driving the said amplifier, and receivers of the self-synchronising type the number of rotary machines of the amplifier being equal to the number of phases of the armature of the transmitter, and a phase-shifter connected in the feed circuit of the receivers.

WILLIAM POLITZER.

REFERENCES CITED

The following references are of record in the file of this patent:

UNITED STATES PATENTS

| Number | Name | Date |
|---|---|---|
| 1,564,788 | Hildebrand | Dec. 8, 1925 |
| 1,575,055 | Japolsky et al. | Mar. 2, 1926 |
| 2,079,253 | Japolsky | May 4, 1937 |
| 2,356,186 | Somers | Aug. 22, 1944 |
| 2,416,579 | Godet | Feb. 25, 1947 |